(12) United States Patent
Miller

(10) Patent No.: US 8,061,303 B2
(45) Date of Patent: Nov. 22, 2011

(54) ANIMAL ISOLATOR

(76) Inventor: Landon Ray Miller, Cuba, IL (US)

( * ) Notice: Subject to any disclaimer, the term of this patent is extended or adjusted under 35 U.S.C. 154(b) by 142 days.

(21) Appl. No.: 12/474,268

(22) Filed: May 28, 2009

(65) Prior Publication Data

US 2010/0300372 A1    Dec. 2, 2010

(51) Int. Cl.
*A01K 1/00* (2006.01)
(52) U.S. Cl. .................. 119/510; 119/512; 119/752
(58) Field of Classification Search .................. 119/502, 119/510, 512, 513, 751, 752, 453
See application file for complete search history.

(56) References Cited

U.S. PATENT DOCUMENTS

| | | | | |
|---|---|---|---|---|
| 3,095,858 | A * | 7/1963 | Bauer | 119/744 |
| 4,991,543 | A * | 2/1991 | Silberman | 119/473 |
| 5,372,092 | A * | 12/1994 | Pederson | 119/510 |
| 6,035,808 | A * | 3/2000 | Herman | 119/732 |
| 6,267,080 | B1 * | 7/2001 | Roy | 119/453 |
| 6,425,347 | B1 * | 7/2002 | Bogner et al. | 119/318 |
| 6,964,245 | B2 * | 11/2005 | Beck | 119/512 |
| 7,389,746 | B2 | 6/2008 | Byl et al. | |
| 7,685,970 | B1 * | 3/2010 | Rains | 119/512 |
| 2003/0140870 | A1 * | 7/2003 | Daniels et al. | 119/752 |
| 2005/0166859 | A1 * | 8/2005 | Weaver | 119/453 |
| 2007/0113794 | A1 * | 5/2007 | Van Liere | 119/518 |
| 2007/0151524 | A1 * | 7/2007 | Byl et al. | 119/512 |
| 2008/0236508 | A1 * | 10/2008 | Seay | 119/453 |
| 2011/0023795 | A1 * | 2/2011 | Huls | 119/840 |

FOREIGN PATENT DOCUMENTS

GB    2278266 A  * 11/1994

* cited by examiner

*Primary Examiner* — Rob Swiatek
*Assistant Examiner* — Lisa Tsang
(74) *Attorney, Agent, or Firm* — Ash Tankha; Lipton, Weinberger & Husick

(57) ABSTRACT

Disclosed herein is an animal isolator and method for isolating one or more animals from a herd. The animal isolator comprises a meshing enclosure for confining the animals. The meshing enclosure comprises a front wall, a rear wall, and a pair of opposing side walls, a partially closed base partially closing a first end of the open ended enclosure, a vehicle mounting assembly, and a gate. The meshing enclosure is detachably attached to the rear end or the front end of a vehicle using the vehicle mounting assembly and is raised above ground surface. The vehicle is driven through the herd. The meshing enclosure is then lowered over the animals and the animals are captured through the opening of the partially closed base. The captured animals are driven onto the platform and are confined to a region defined by the platform using the gate.

7 Claims, 12 Drawing Sheets

US 8,061,303 B2

ANIMAL ISOLATOR

BACKGROUND

The apparatus and method disclosed herein, in general, relates to animal husbandry. More particularly, the apparatus and method disclosed herein relates to isolating one or more animals from a herd using an animal isolator.

Typically, in animal husbandry, animals are required to be isolated from a herd of animals for vaccination and for other medical reasons. The possessiveness of animals for their offspring generally elicits violent reactions from the animals towards a person attempting to isolate the off-spring from the herd. Consequently, medical procedures and animal rearing processes that require isolating the animal off spring from the herd are hindered due to aggressive reactions from the animals.

The conventional techniques used for isolating animals include manual isolation which requires a significant amount time, effort and risk to a person who tries to isolate the off-spring. The off-spring, for example, a calf is conventionally isolated from the mother cow using a permanent fence or pens. However this technique requires a farmer performing the isolation to drive away the mother cow outside the fenced area and in the process the farmer is unprotected and is often attacked by the mother cow. There is a need for an isolation device mounted on a vehicle without requiring manual segregation and that allows isolation of the calf from the mother cow in a safe manner.

Hence, there is an unmet need for an animal isolator that facilitates the process of isolating one or more animals from the herd.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The animal isolator and method disclosed herein addresses the above stated need for facilitating the process of isolating one or more animals form a herd. The animal isolator disclosed herein comprises a meshing enclosure for confining the animals. The meshing enclosure comprises a front wall, a rear wall, a pair of opposing side walls, and a partially closed base. The opposing side walls comprise a first side wall and a second side wall. The front wall, the rear wall, and the opposing side walls define an open ended enclosure. A tool box may be detachably attached to the front wall of the meshing enclosure.

The partially closed base partially closes a first end of the open ended enclosure. The meshing enclosure may comprise a ceiling for closing a second end of the open ended enclosure. The partially closed base comprises a platform and an opening to a ground surface. One or more animals are captured through the opening and driven onto the platform. The platform defines at least four edges on a periphery of the platform, such that two of the edges adjoin the first side wall and the second side wall, another one of the edges adjoins the front wall, and another one of the edges is exposed to the opening to the ground surface. The platform comprises multiple first drain holes for draining liquid matter from the platform for maintaining hygiene inside the animal isolator. A padding may be positioned over a top surface of the platform for providing comfort to the animals. The padding comprises multiple second drain holes corresponding to the first drain holes for draining the liquid matter from the platform.

The meshing enclosure further comprises a gate for confining the animals to a region defined by the platform. In an embodiment, the gate extends from the first side wall to the second side wall in a closed position for confining the animals to the region defined by the platform. In this embodiment, the gate is pivotally hinged to the second side wall. A latch is provided on the first side wall for fastening the gate to the first side wall in the closed position. In another embodiment, the gate is a sliding gate extending from the first side wall to the second side wall. The sliding gate slides back and forth in a region defined by the opening to the ground surface in the meshing enclosure. In an embodiment, the sliding gate is controlled using a sliding assembly. The sliding assembly comprises one or more tracks, one or more rollers, and a hydraulic assembly. The sliding gate slides due to the rolling of the rollers along the tracks. The tracks can be mounted inside or outside the meshing enclosure. When the tracks are mounted outside the meshing enclosure, a horizontal clearance that runs along the entire length of each of the tracks is provided to allow forward and backward movement of the gate to track attachment. When mounted inside the meshing enclosure, shielding is positioned on one or more of the tracks for preventing the limbs of the animals from getting caught in the tracks by rendering the tracks inaccessible to the animals. In an embodiment, the shielding provided on the tracks is retractable.

The meshing enclosure further comprises an access unit for providing access for a user into the meshing enclosure. The access unit comprises one or more openings and one or more doors. The openings of the access unit are provided on sections of the opposing side walls adjoining two of the edges of the platform. The doors are operable to close the openings of the access unit. Each of the doors is pivotally hinged to one of the opposing side walls.

The animal isolator further comprises a vehicle mounting assembly for detachably attaching the meshing enclosure to a rear end or a front end of a vehicle. The vehicle mounting assembly comprises multiple tubular structures and an attachment unit. The tubular structures are disposed on a lower surface of the platform of the partially closed base. The tubular structures are provided for inserting, for example, multiple adjustable width forks of the rear end or the front end of a fork loader into the tubular structures for detachably attaching the meshing enclosure to the vehicle. Each of the tubular structures defines a front edge aligned with an edge common to the platform and the front wall. The attachment unit is provided on the front wall for detachably attaching the meshing enclosure to the rear end or the front end of the vehicle. The attachment unit comprises, for example, a hook or a clamp. When the vehicle has been hooked to the meshing enclosure using the attachment unit and the adjustable width forks of the vehicle are inserted into the tubular structures, the meshing enclosure can then be raised above ground surface and driven towards the herd.

The meshing enclosure further comprises an opening at the rear wall and a first wing and a second wing for guiding the animals into the meshing enclosure through the opening at the rear wall. The first wing is pivotally hinged to a first edge common to the first side wall and the rear wall. The second wing is pivotally hinged to a second edge common to the second side wall and the rear wall. A first hydraulic controller attached to the first side wall and the first wing controls the pivotal movement of the first wing. A second hydraulic controller attached to the second side wall and the second wing controls the pivotal movement of the second wing. Further-more, a cattle squeeze may be provided within the meshing enclosure for restricting movement of the animals inside the meshing enclosure.

A user of the animal isolator detachably attaches the meshing enclosure to the rear end or the front end of the vehicle using the vehicle mounting assembly and raises the meshing enclosure above the ground surface. The user drives the vehicle through the herd, lowers the meshing enclosure over one or more animals from the herd, and captures the animals through the opening to the ground surface in the partially closed base of the meshing enclosure for isolating the animals from the herd. The user then drives the captured animals onto the platform and confines the captured animals to a region defined by the platform in the meshing enclosure using the gate. The user may then treat the animals confined to the meshing enclosure with medication, vaccines, etc. or haul the animals to another place for treatment.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
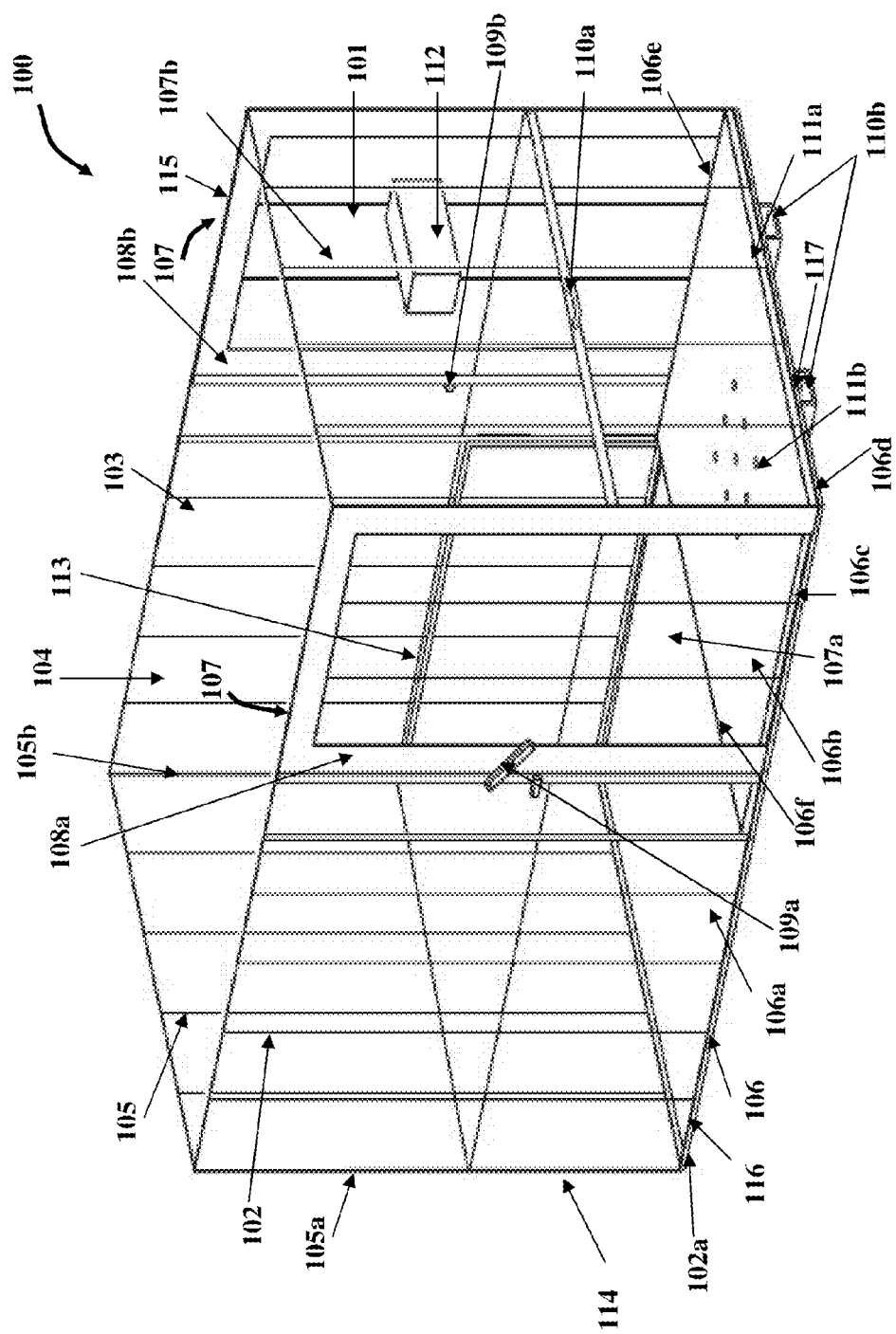
FIG. 1 exemplarily illustrates an isometric view of an animal isolator.

FIG. 1 exemplarily illustrates an isometric view of an animal isolator 100. The animal isolator 100 disclosed herein isolates one or more animals from a herd. The animal isolator 100 comprises a meshing enclosure 114 for confining one or more animals. The meshing enclosure 114 is, for example, of a rectangular parallelepiped shape. The meshing enclosure 114 is, for example, made of a metallic substance. The meshing enclosure 114 comprises a front wall 101, a rear wall 105, a pair of opposing side walls 102 and 103, and a partially closed base 106. The opposing side walls 102 and 103 comprise a first side wall 102 and a second side wall 103. The front wall 101, the rear wall 105, and the opposing side walls 102 and 103 define an open ended enclosure. In an embodiment, a ceiling 104 is provided on the top of the meshing enclosure 114. The ceiling 104 closes a second end 115 of the open ended enclosure.

The partially closed base 106 partially closes a first end 116 of the open ended enclosure. The partially closed base 106 comprises a platform 106b and an opening 106a to a ground surface. One or more animals are captured through the opening 106a and driven onto the platform 106b. The platform 106b defines at least four edges 106c, 106d, 106e, and 106f on a periphery of the platform 106b, such that two of the edges 106c and 106e adjoin the first side wall 102 and the second side wall 103 respectively, another one of the edges 106d adjoins the front wall 101, and another one of the edges 106f is exposed to the opening 106a to the ground surface.

The platform 106b comprises multiple first drain holes (not shown) for draining liquid matter from the platform 106b for maintaining hygiene inside the animal isolator 100. A padding 111a is optionally positioned over a top surface of the platform 106b for providing comfort to the animals. The padding 111a is, for example, made of an elastic material. The elastic material is, for example, rubber. The padding 111a comprises multiple second drain holes 111b corresponding to the first drain holes for draining the liquid matter from the platform 106b.

The animal isolator 100 further comprises a vehicle mounting assembly 110a and 110b for detachably attaching the meshing enclosure 114 to a rear end or a front end of a vehicle. The vehicle mounting assembly 110a and 110b comprises multiple tubular structures 110b and an attachment unit 110a. The tubular structures 110b are disposed on the lower surface of the platform 106b of the partially closed base 106. The tubular structures 110b are provided for inserting, for example, multiple adjustable width forks of the rear end or the front end of a fork loader into the tubular structures 110b, for detachably attaching the meshing enclosure 114 to the fork loader. Each of the tubular structures 110b defines a front edge 117 aligned with an edge 106d common to the platform 106b and the front wall 101.

Figure 2:
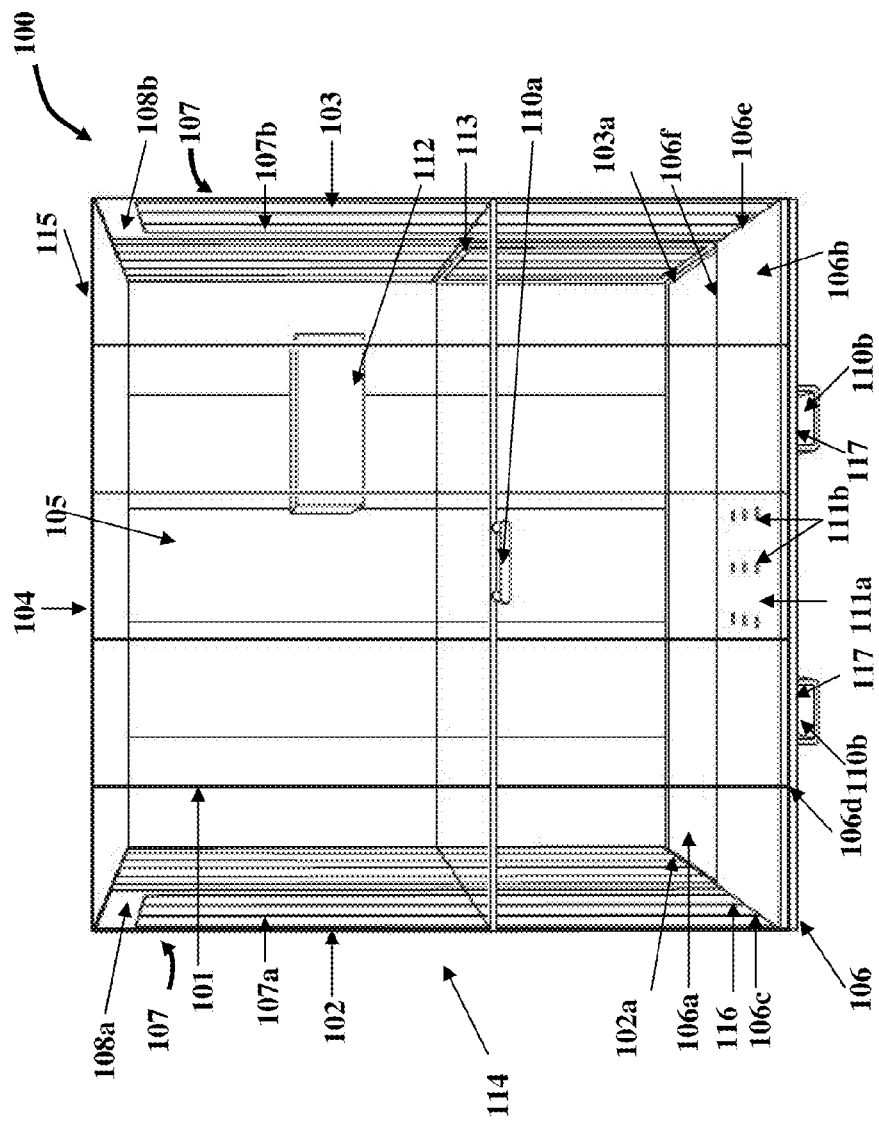
FIG. 2 exemplarily illustrates a front perspective view of the animal isolator.
Figure 3:
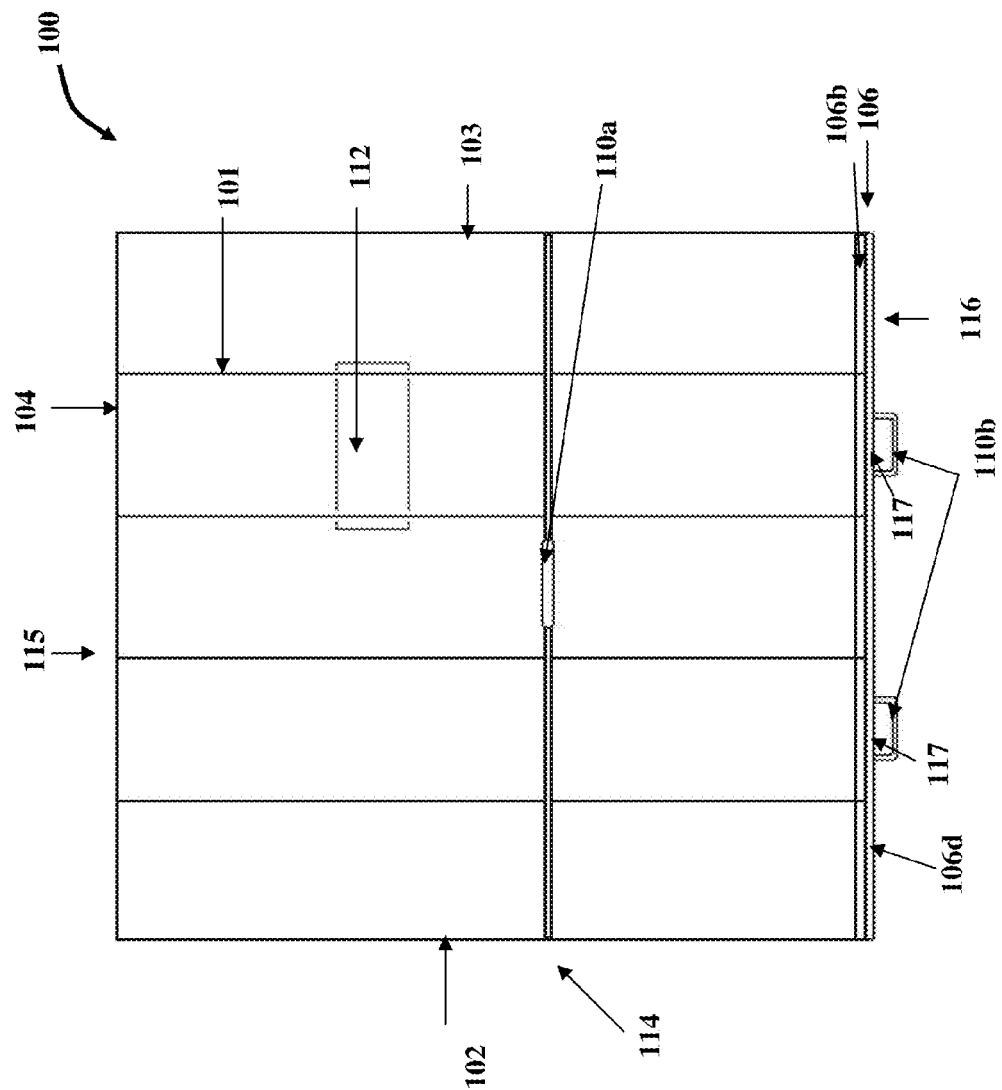
FIG. 3 exemplarily illustrates a front view of the animal isolator.

The attachment unit 110a is provided on the front wall 101 for detachably attaching the meshing enclosure 114 to the rear end or the front end of the vehicle. FIG. 2 exemplarily illustrates a front perspective view of the animal isolator 100. FIG. 3 exemplarily illustrates a front view of the animal isolator 100. As exemplarily illustrated in FIGS. 1-3, the attachment unit 110a comprises, for example, a hook or a clamp. When the vehicle has been hooked to the meshing enclosure 114 using the attachment unit 110a and the adjustable width forks are inserted into the tubular structures 110b, the meshing enclosure 114 can then be raised above ground surface and driven towards the herd. A tool box 112, as illustrated in FIGS. 1-6, FIGS. 8-9, and FIGS. 11-12, may be provided in the meshing enclosure 114. The tool box 112 is detachably attached to the front wall 101 of the meshing enclosure 114.

Figure 4:
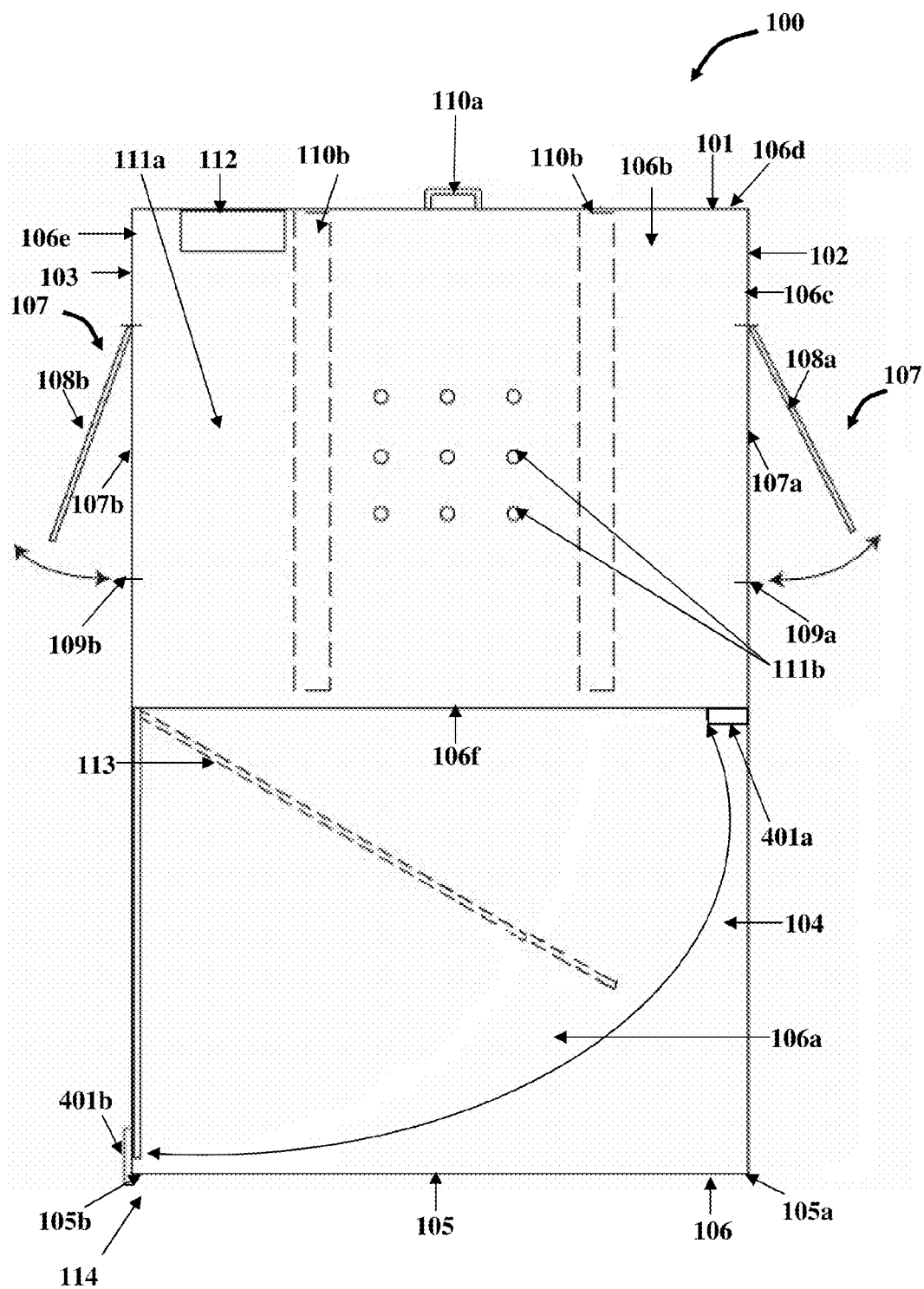
FIG. 4 exemplarily illustrates a top view of the animal isolator.
Figure 5:
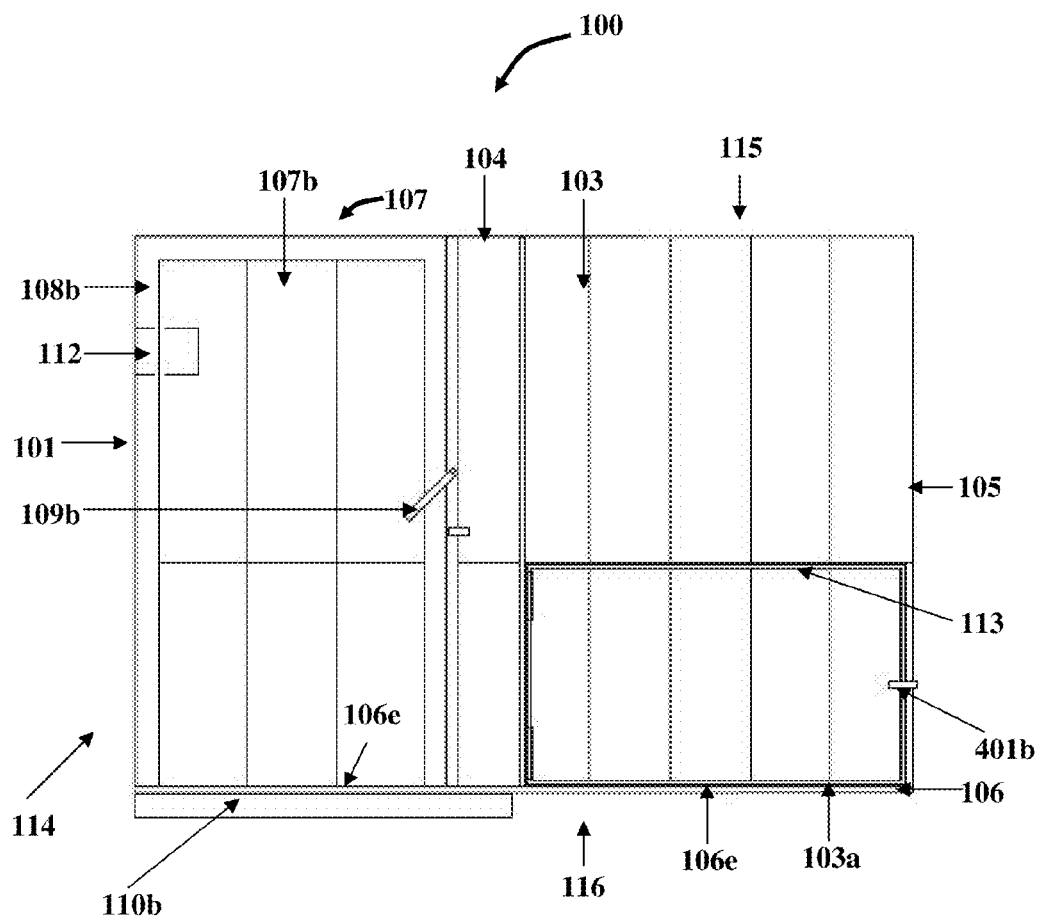
FIG. 5 exemplarily illustrates a right side view of the animal isolator.
Figure 6:
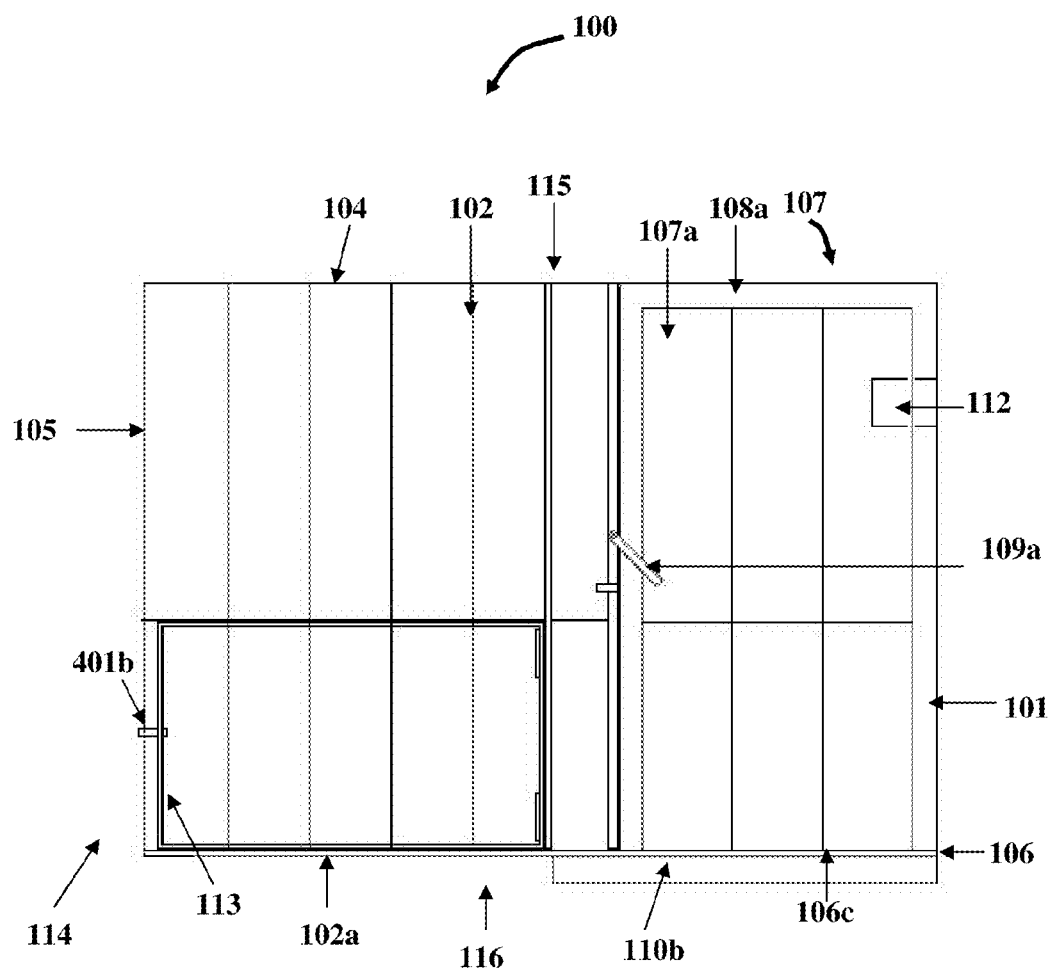
FIG. 6 exemplarily illustrates a left side view of the animal isolator.

As exemplary illustrated in FIGS. 4-6, the meshing enclosure 114 further comprises an access unit 107 for providing access to a user into the meshing enclosure 114. The access unit 107 comprises one or more openings 107a and 107b and one or more doors 108a and 108b. The openings 107a and 107b are provided on sections of the opposing side walls 102 and 103 adjoining two of the edges 106c and 106e of the platform 106b. The doors 108a and 108b are operable to close the openings 107a and 107b. Each of the doors 108a and 108b is pivotally hinged to one of the opposing side walls 102 and 103. A top view of the animal isolator 100 is exemplarily illustrated in FIG. 4. A right side view of the animal isolator 100 is exemplarily illustrated in FIG. 5. A left side view of the animal isolator 100 is exemplarily illustrated in FIG. 6. The doors 108a and 108b are detachably attached to the opposing side walls 102 and 103 via latches 109a and 109b respectively.

The meshing enclosure 114 further comprises a gate 113 for confining the animals to a region defined by the platform 106b. In an embodiment, the gate 113 has selectable open and closed positions. In this embodiment, the gate 113, when in the closed position and as illustrated in FIG. 4, extends from the first side wall 102 to the second side wall 103. The gate 113, when in the open position, is parallel to the second side wall 103 as illustrated by FIG. 1. The gate 113 is pivotally hinged to the second side wall 103 for movement between the open and closed positions. A first latch 401a is provided on the first side wall 102 for fastening the gate 113 to the first side wall 102 in a closed position and a second latch 401b is provided on the second side wall 103 for fastening the gate 113 to the second side wall 103 in an open position.

In another embodiment, the gate is a sliding gate 801 extending from the first side wall 102 to the second side wall 103 and perpendicular to the partially closed base 106. The sliding gate 801 slides back and forth between the rear wall 105 and the edge 106f of the platform 106b exposed to the opening 106a to the ground surface, in a region defined by the opening 106a to the ground surface in the meshing enclosure 114. The sliding gate 801 comprises an upper edge 811, a lower edge 1003, and a pair of opposing edges 1004 and 1005 forming a closed geometry as exemplarily illustrated in FIG. 10. The upper edge 811 of the sliding gate 801 is parallel to the partially closed base 106 of the meshing enclosure 114 and comprises a first end 809a adjacent to the first side wall 102 and a second end 809b adjacent to the second side wall 103. The lower edge 1003 is parallel to the partially closed base 106 of the meshing enclosure 114 and comprises a third end 1002a adjacent to the first side wall 102 and a fourth end 1002b adjacent to the second side wall 103.

A sliding assembly 800 controls the movement of the sliding gate 801. The sliding assembly 800 comprises multiple tracks 802a, 802b, 1001c, and 1001d, multiple rollers 808a, 808b, 1001a, and 1001b, and a hydraulic assembly 815. The arrangement of the sliding assembly 800 in the animal isolator 100 is exemplarily illustrated in the FIGS. 8-11. A top view of the animal isolator 100 comprising a sliding gate 801 in a closed position is exemplarily illustrated in FIG. 8. A top view of the animal isolator 100 comprising the sliding gate 801 in a partially open position is exemplarily illustrated in FIG. 9. A vertical cross sectional view of the animal isolator 100 comprising the sliding gate 801 is exemplarily illustrated in FIG. 10. A left side view of the animal isolator 100 comprising the sliding gate 801 is exemplarily illustrated in FIG. 11.

Figure 8:
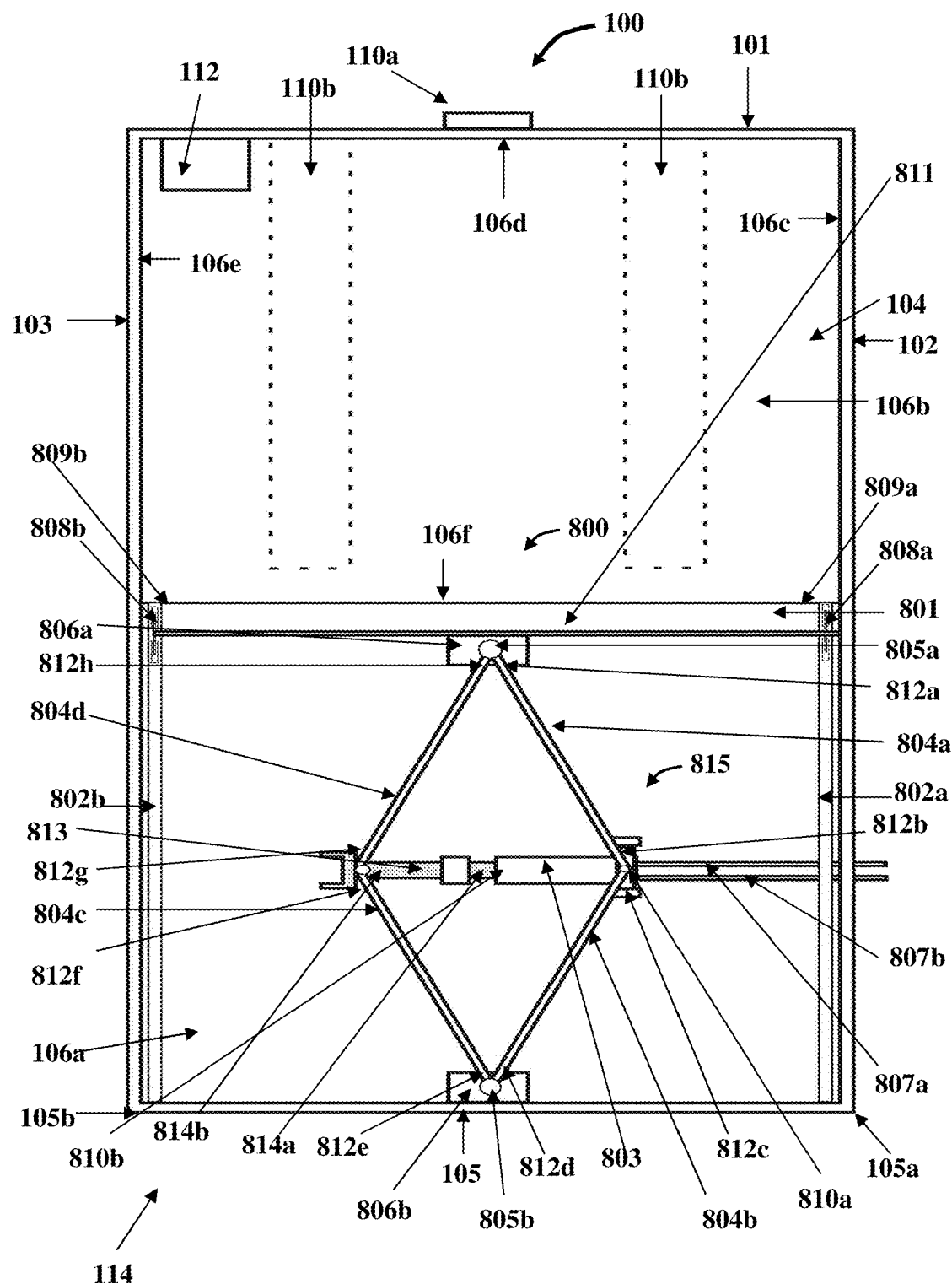
FIG. 8 exemplarily illustrates a top view of the animal isolator comprising a sliding gate in a closed position.
Figure 9:
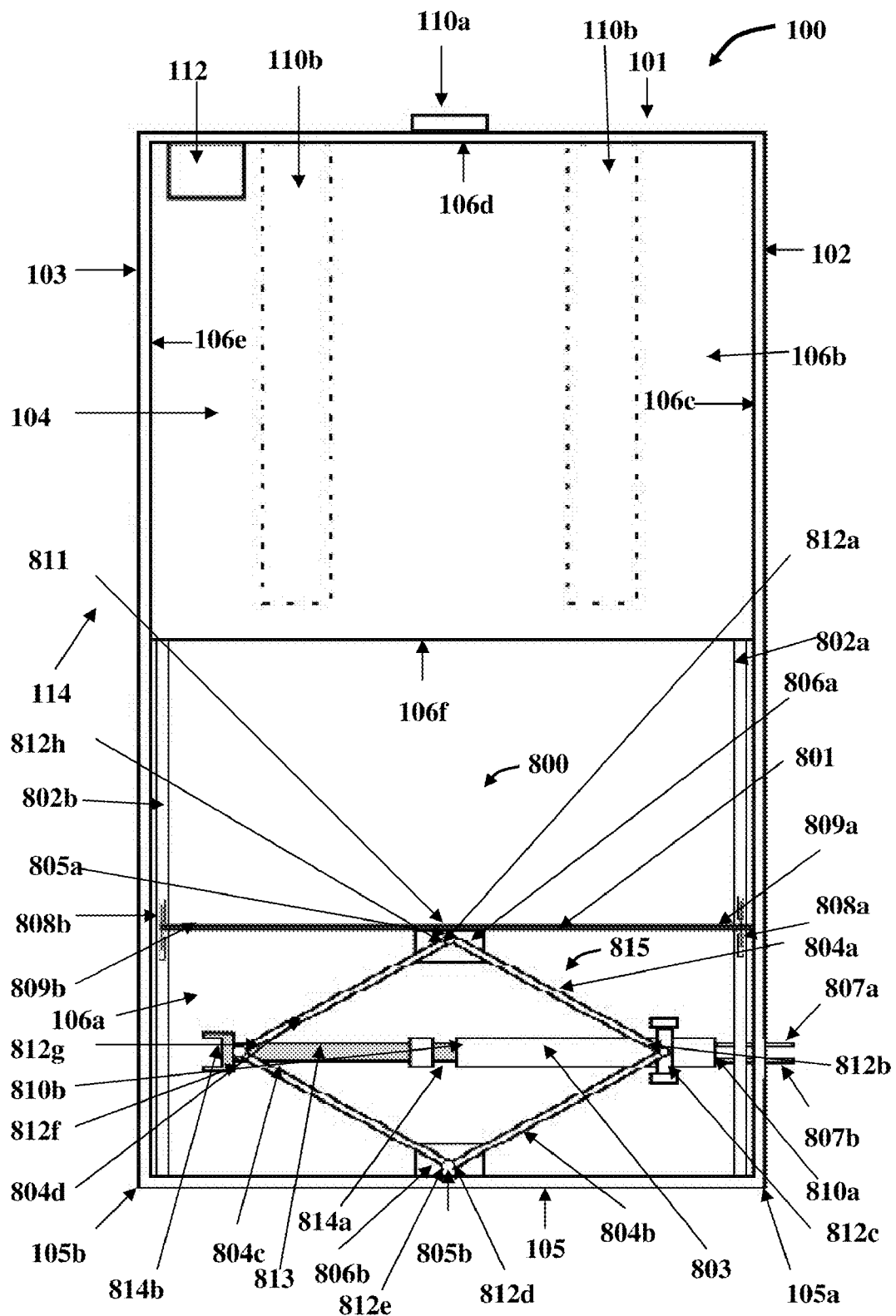
FIG. 9 exemplarily illustrates a top view of the animal isolator comprising the sliding gate in a partially open position.
Figure 10:
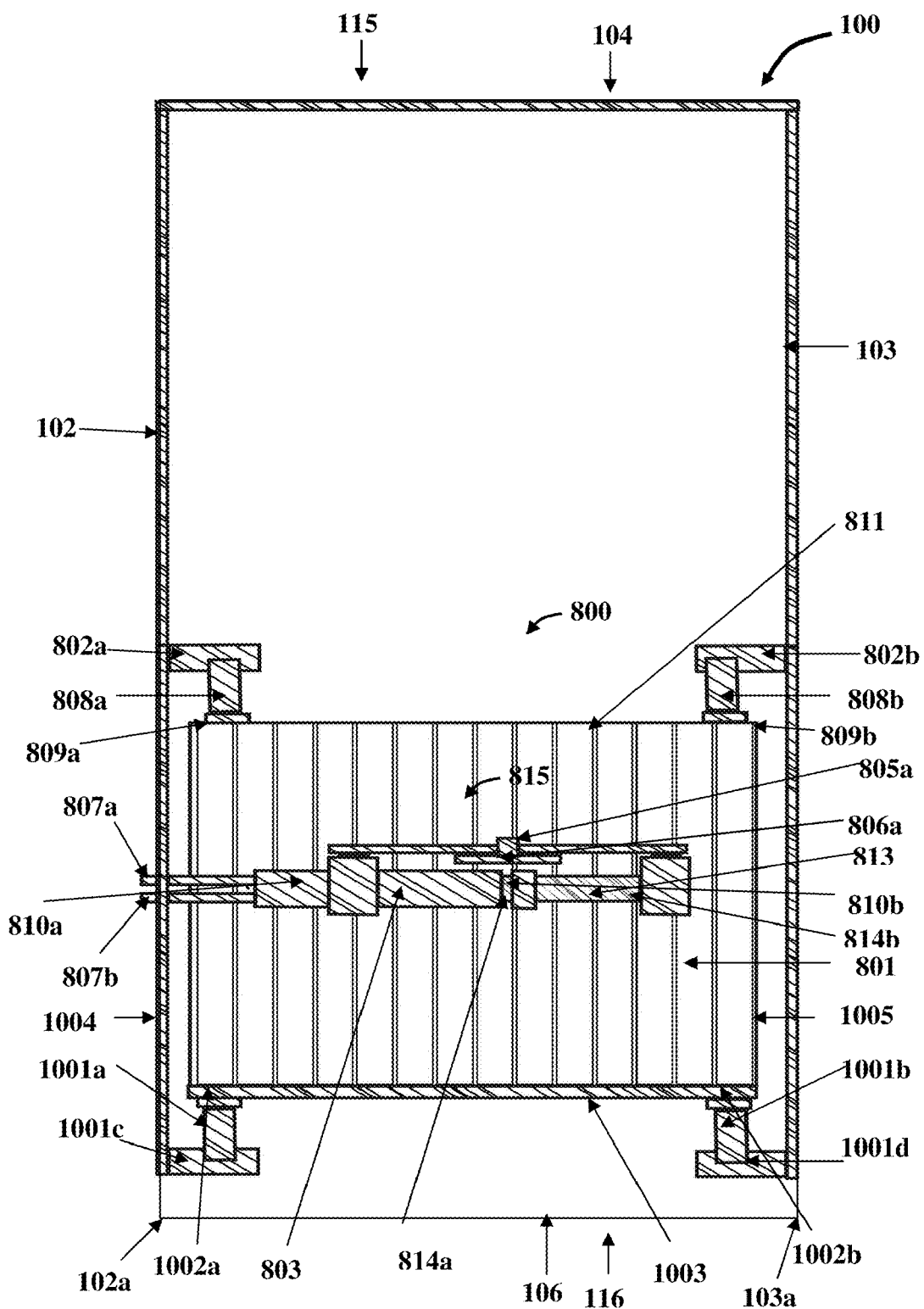
FIG. 10 exemplarily illustrates a vertical cross sectional view of the animal isolator comprising the sliding gate.
Figure 11:
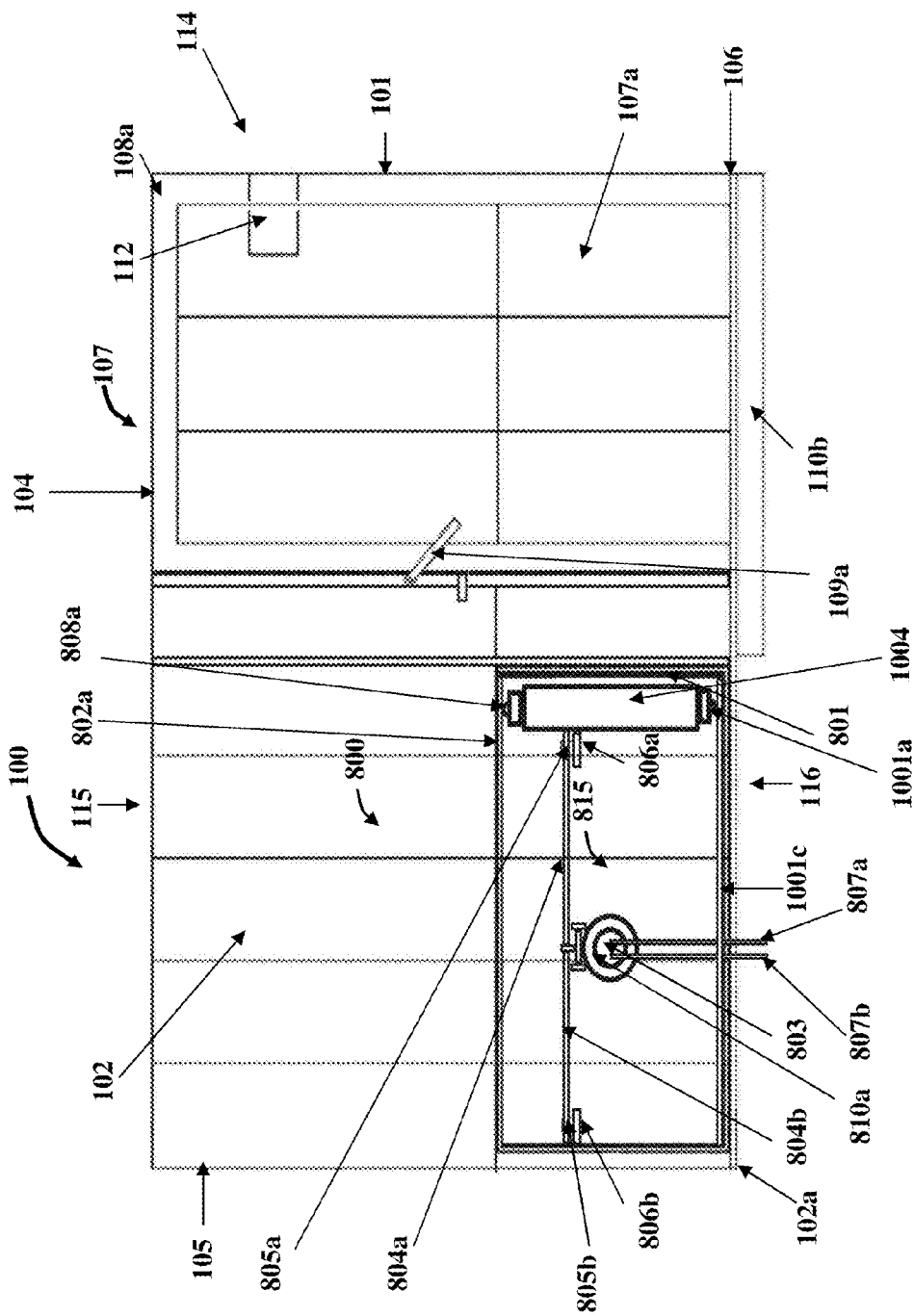
FIG. 11 exemplarily illustrates a left side view of the animal isolator comprising the sliding gate.

The tracks 802a, 802b, 1001c, and 1001d extend from the rear wall 105 to an edge corresponding to an edge 106f of the platform 106b exposed to the opening 106a to the ground surface as exemplarily illustrated in FIGS. 8-10. The tracks 802a, 802b, 1001c, and 1001d comprise a first track 802a adjacent to the first end 809a of the upper edge 811 of the sliding gate 801, a second track 802b adjacent to the second end 809b of the upper edge 811 of the sliding gate 801, a third track 1001c adjacent to the third end 1002a of the lower edge 1003 of the sliding gate 801, and a fourth track 1001d adjacent to the fourth end 1002b of the lower edge 1003 of the sliding gate 801 as exemplarily illustrated in FIG. 10. The first track 802a, the second track 802b, the third track 1001c, and the fourth track 1001d are parallel to the opposing side walls 102 and 103 and the partially closed base 106. The first track 802a and the second track 802b are exemplarily illustrated in FIGS. 8-9. The third track 1001c and the fourth track 1001d are exemplarily illustrated in FIG. 10. The first track 802a and the third track 1001c are attached to the first side wall 102, and the second track 802b and the fourth track 1001d are attached to the second side wall 103 as exemplarily illustrated in FIG. 10.

Although FIGS. 8-11 illustrate the tracks 802a, 802b, 1001c, and 1001d on the inside of the opposing side walls 102 and 103, the tracks 1001c, and 1001d may also be positioned on the outside of the opposing side walls 102 and 103. In this embodiment, the third track 1001c is attached to a first lower edge 102a of the first side wall 102 and the fourth track 1001d is attached to a second lower edge 103a of the second side wall 103. The third track 1001c and the fourth track 1001d are disposed below the partially closed base 106 of the meshing enclosure 114.

The sliding assembly 800 further comprises a shielding (not shown) positioned on one or more of the tracks 802a, 802b, 1001c, and 1001d for preventing the animals from getting caught in the tracks 802a, 802b, 1001c, and 1001d by rendering the tracks 802a, 802b, 1001c, and 1001d inaccessible to the animals. In an embodiment, the shielding is retractable.

As exemplarily illustrated in FIG. 10, the rollers 808a, 808b, 1001a, and 1001b comprise a first roller 808a, a second roller 808b, a third roller 1001a, and a fourth roller 1001b. The first roller 808a is attached to the first end 809a of the upper edge 811 of the sliding gate 801 and is rollably positioned in the first track 802a. The second roller 808b is attached to the second end 809b of the upper edge 811 of the sliding gate 801 and is rollably positioned in the second track 802b. The third roller 1001a is attached to the third end 1002a of the lower edge 1003 of the sliding gate 801 and is rollably positioned in the third track 1001c. The fourth roller 1001b is attached to the fourth end 1002b of the lower edge 1003 of the sliding gate 801 and is rollably positioned in the fourth track 1001d.

As exemplarily illustrated in FIGS. 8-11, the hydraulic assembly 815 drives the sliding gate 801. The hydraulic assembly 815 comprises a hydraulic cylinder 803 horizontally disposed and parallel to the sliding gate 801, a piston 813, and a set of bars 804a, 804b, 804c, and 804d. The hydraulic cylinder 803 comprises an inlet hose 807a and an outlet hose 807b connected to a first end 810a of the hydraulic cylinder 803 for allowing a hydraulic fluid to enter and exit respectively from the hydraulic cylinder 803. The piston 813 is concentric with and moves along the length of the hydraulic cylinder 803. A first end 814a of the piston 813 is fitted into a second end 810b of the hydraulic cylinder 803.

The set of bars 804a, 804b, 804c, and 804d comprises a first bar 804a, a second bar 804b, a third bar 804c, and a fourth bar 804d. A first end 812a of the first bar 804a and a second end 812h of the fourth bar 804d are bolted together using a first swivel bolt 805a. A first end 812e of the third bar 804c and a second end 812d of the second bar 804b are bolted together using a second swivel bolt 805b. A second end 812b of the first bar 804a and a first end 812c of the second bar 804b are connected to the first end 810a of the hydraulic cylinder 803. A first end 812g of the fourth bar 804d and a second end 812f of the third bar 804c are connected to a second end 814b of the piston 813. The first swivel bolt 805a is supported by a first swivel plate 806a attached to the sliding gate 801. The second swivel bolt 805b is supported by a second swivel plate 806b attached to the rear wall 105.

Figure 12:
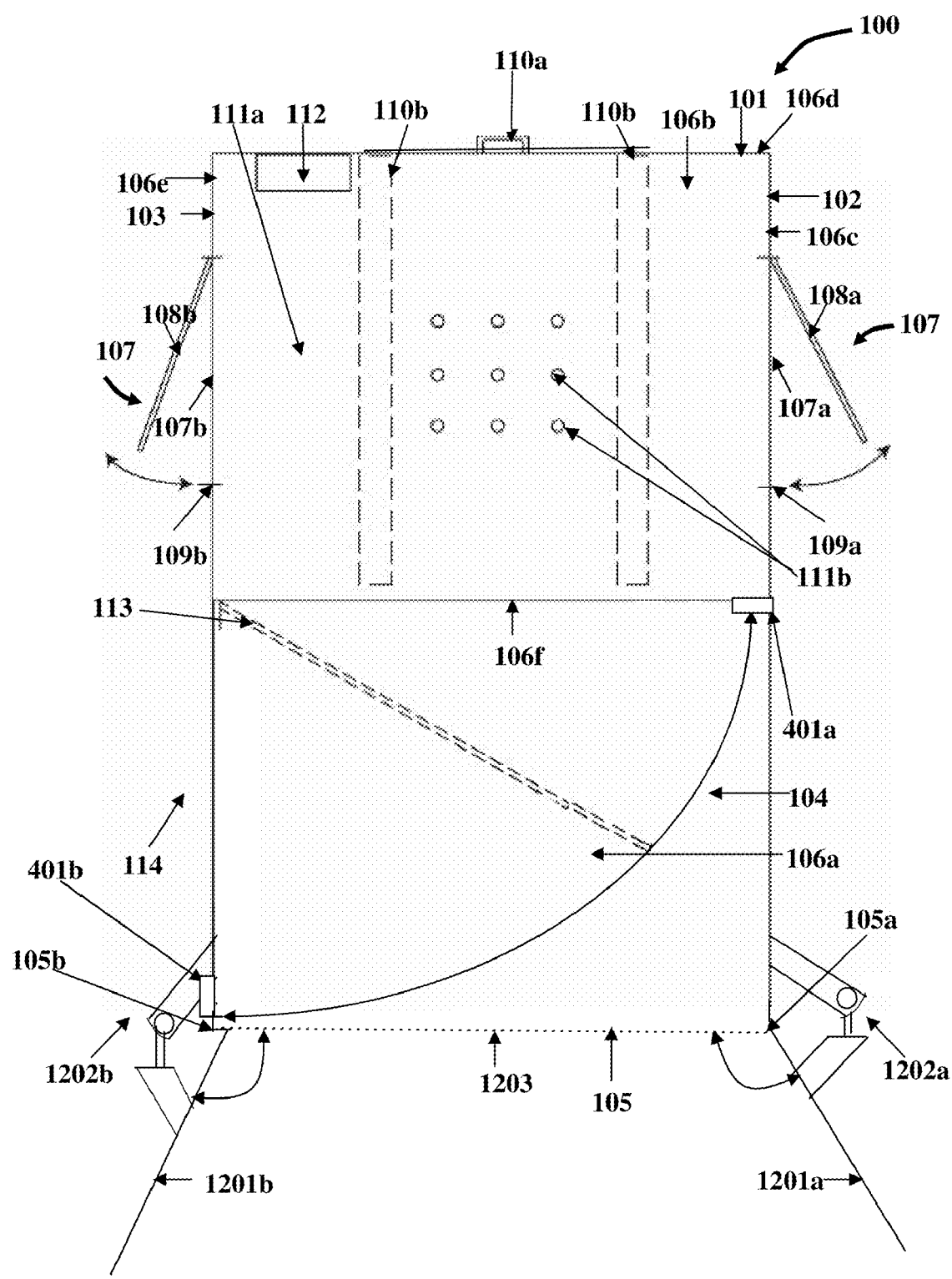
FIG. 12 exemplarily illustrates a top view of the animal isolator comprising a pair of wings pivotally hinged to a first edge and a second edge of the rear wall.

In an embodiment of the animal isolator 100, the meshing enclosure 114 comprises an opening 1203 at the rear wall 105 as exemplarily illustrated in FIG. 12. FIG. 12 exemplarily illustrates a top view of the animal isolator 100 comprising a pair of wings 1201a and 1201b pivotally hinged to a first edge 105a and a second edge 105b of the rear wall 105. The pair of wings 1201a and 1201b comprises a first wing 1201a and a second wing 1201b for guiding the animals into the meshing enclosure 114 through the opening 1203 at the rear wall 105. The first wing 1201a is pivotally hinged to a first edge 105a common to the first side wall 102 and the rear wall 105. The second wing 1201b is pivotally hinged to a second edge 105b common to the second side wall 103 and the rear wall 105.

The animal isolator 100 further comprises a first hydraulic controller 1202a and a second hydraulic controller 1202b. The first hydraulic controller 1202a is attached to the first side wall 102 and the first wing 1201a for controlling the pivotal movement of the first wing 1201a. The second hydraulic controller 1202b is attached to the second side wall 103 and the second wing 1201b for controlling the pivotal movement of the second wing 1201b. Controlling the operation of the first hydraulic controller 1202a and the second hydraulic controller 1202b can be performed by connecting the first hydraulic controller 1202a and the second hydraulic controller 1202b to a hydraulic system (not shown) powered by the vehicle and controlled by a hydraulic remote (not shown). The first hydraulic controller 1202a and the second hydraulic controller 1202b work in tandem for controlling the pivotal movement of the first wing 1201a and the pivotal movement of the second wing 1201b respectively.

In an embodiment of the animal isolator 100, the meshing enclosure 114 comprises a cattle squeeze (not shown) for restricting the movement of the animals inside the meshing enclosure 114. Restricting the movement of the animals by the cattle squeeze enables administering vaccinations to the animals, tagging the animals, treatment of the animals by a veterinarian, and other animal husbandry purposes. The animals are allowed to exit the animal isolator 100 by opening the gate 113. The cattle squeeze is, for example, located at the gate 113 of the animal isolator 100. The cattle squeeze is, for example, a standard cattle squeeze comprising a cattle squeeze frame (not shown) and a pair of opposing side panels (not shown) pivoted on a base frame (not shown). The side panels are spaced apart from each other for defining an enclosure within the cattle squeeze frame. The cattle squeeze frame comprises a rear portion (not shown) adjacent to the side panels for allowing an animal to enter the cattle squeeze. The cattle squeeze frame further comprises a front portion (not shown) adjacent to the side panels for allowing the animals to exit the cattle squeeze. The cattle squeeze frame is mounted on the inner side of the first wing 1201a of the animal isolator 100 as exemplarily illustrated in FIG. 12. One of the side panels are in the immediate vicinity of the first wing 1201a. The opposite side panel is secured to the second wing 1201b using one or more quick latch mechanisms (not shown) when the cattle squeeze is used for holding an animal. In an embodiment, the cattle squeeze frame is mounted on the outer side of the first wing 1201a of the animal isolator 100. In another embodiment, the cattle squeeze frame is mounted on the second wing 1201b of the animal isolator 100.

As exemplarily illustrated in FIG. 12, the first wing 1201a and the second wing 1201b are closed for allowing the quick latch mechanism (not shown) to secure the cattle squeeze (not shown). The cattle squeeze, for example comprises a pre-catch position, a hold position, and a release position. In the pre-catch position, the side panels pivot towards the outside of the enclosure, allowing the animals to enter the enclosure through the opening 1203 in the rear wall 105 as illustrated in FIG. 12. In the hold position, a pair of squeeze bars (not shown), each positioned at either side of the front portion, captures the neck portion of the animal as the head of the animal passes through the front portion. The side panels pivot towards the inside of the enclosure, restricting the movement of the animal. The hold position of the cattle squeeze allows securing the animal within the enclosure for treatment. In the release position, the side panels are pivoted towards the outside of the enclosure and the squeeze bars release the head of the animal, allowing the animal to exit the cattle squeeze. In an embodiment, the cattle squeeze is positioned near the gate 113.

Figure 7:
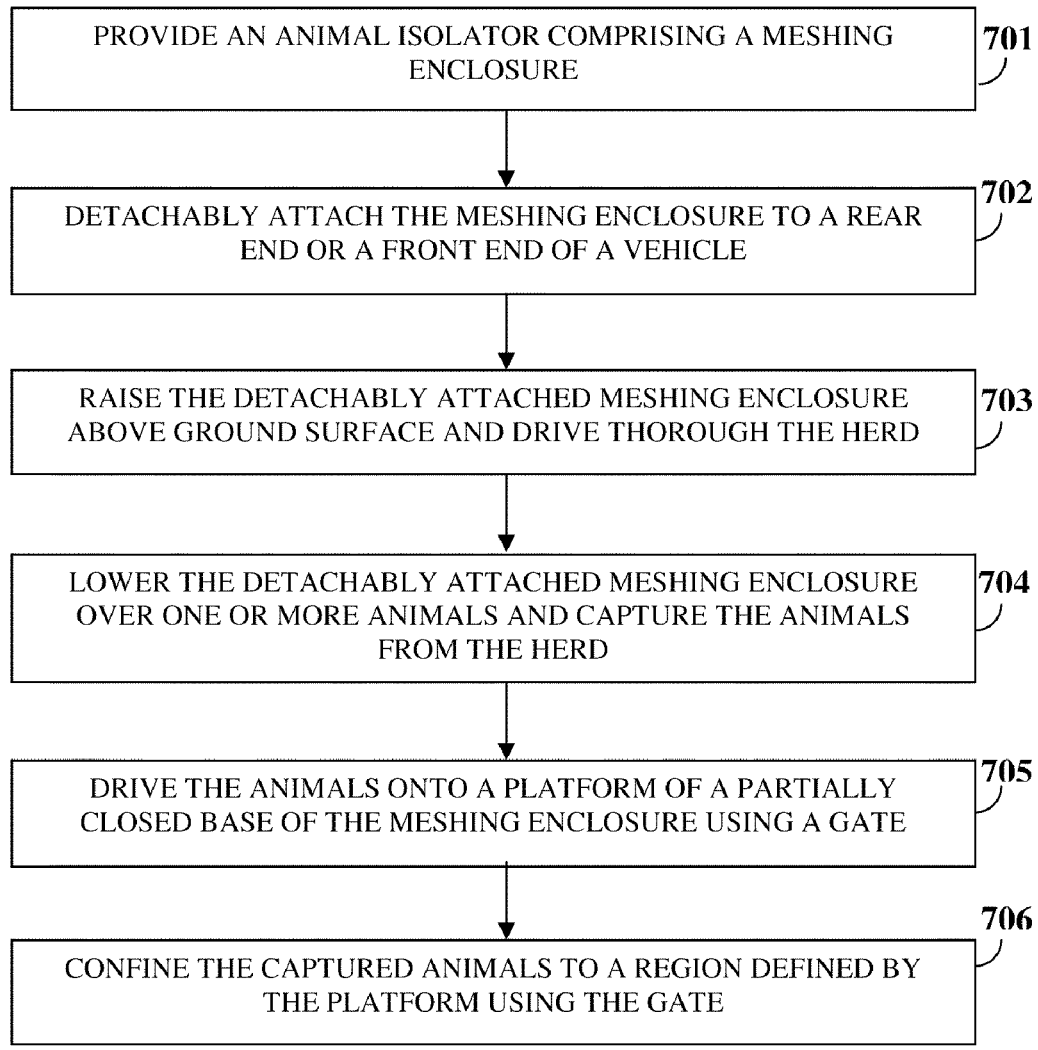
FIG. 7 illustrates a method of isolating one or more animals from a herd using an animal isolator.

FIG. 7 illustrates a method of isolating one or more animals from a herd using an animal isolator 100. An animal isolator 100 comprising a meshing enclosure 114, a vehicle mounting assembly 110a and 110b, and a gate 113 or 801 is provided 701. The animal isolator 100 is illustrated and described in the detailed description of FIGS. 1-6 and FIGS. 8-12. A user detachably attaches 702 the meshing enclosure 114 to the rear end or the front end of a vehicle using the vehicle mounting assembly 110a and 110b. The user then raises 703 the detachably attached meshing enclosure 114 above the ground surface sufficient to capture the animals and drives the vehicle through the herd. The user then lowers 704 the detachably attached meshing enclosure 114 over the animals from the herd and captures one or more animals through an opening 106a to the ground surface in the partially closed base 106 of the detachably attached meshing enclosure 114 for isolating one or more animals from the herd.

The user then drives 705 the captured animals onto the platform 106b using the gate 113 or 801 of the detachably attached meshing enclosure 114 and confines 706 the captured animals to a region defined by the platform 106b in the meshing enclosure 114 using the gate 113 or 801, thereby isolating the animals from the herd. In an embodiment where the gate is the sliding gate 801 controlled by the sliding assembly 800. The sliding assembly 800 is explained in the detailed description of FIGS. 8-11. After driving the animals onto the platform 106b, the user draws the hydraulic fluid out of the hydraulic cylinder 803 via the outlet hose 807b for reducing the hydraulic pressure inside the hydraulic cylinder 803 which allows the piston 813 to move into the hydraulic cylinder 803 due to the reduced pressure. The first bar 804a and the fourth bar 804d exert force onto the sliding gate 801 when the piston 813 moves. The exerted force moves the sliding gate 801 towards the edge 106f of the platform 106b exposed to the opening 106a to the ground surface 106a by rolling of the rollers 808a, 808b, 1001a, and 1001b along the tracks 802a, 802b, 1001c, and 1001d. The sliding gate 801 reaches the edge 106f of the platform 106b exposed to the opening 106a to the ground surface 106a, thereby confining the animals driven onto the platform 106b to the region defined by the platform 106b.

In the embodiment of the animal isolator 100 as exemplarily illustrated in FIG. 12, the user detachably attaches the meshing enclosure 114 to the front end of the vehicle. The user opens the first wing 1201a and the second wing 1201b for guiding the animals into the meshing enclosure 114 though the opening 1203 at the rear wall 105. The user drives the animals into the meshing enclosure 114 through the opening 1203 at rear wall 105. The user then closes the first wing 1201a and the second wing 1201b using the first hydraulic controller 1202a and the second hydraulic controller 1202b as exemplarily illustrated in FIG. 12. The user drives the animals onto the platform 106b and closes the gate 113 to confine the animals to the region defined by the platform 106b. The user may then restrict the movement of the animals inside the meshing enclosure 114 using the cattle squeeze (not shown).

The user may then treat the animals confined in the meshing enclosure 114 with medication, vaccines, etc. or may haul the animals to another place for treatment. The user treats the isolated animals using the tool box 112 provided inside the meshing enclosure 114.

Isolating animals using the animal isolator 100 facilitates the processes involved in animal husbandry requiring isolating one or more calves from the herd. Further, using the animal isolator 100 ensures the safety of the user by preventing direct confrontation of the user with the herd during the process of isolating the young ones from the herd. The animal isolator 100 is used for isolating calves from a herd of mother cows. A first user detachably attaches the animal isolator 100 to the rear end of a vehicle, for example, a fork lift or a fork loader by inserting the forks of the fork lift into the tubular structures 110b and hooking the fork lift to the attachment unit 110a of the vehicle mounting assembly 110a and 110b. The user then drives the animal isolator 100 through the herd comprising multiple cows and multiple calves. On encountering the calves, the user raises the meshing enclosure 114 above the ground surface sufficient to allow the calf to be captured through opening 106a. The user then lowers the detachably attached meshing enclosure 114 over the calves from the herd and captures one or more calves through the opening 106a at the ground surface.

A second user may enter the meshing enclosure 114 through one of the doors 108a and 108b and drives the captured calves onto the platform 106b in the meshing enclosure 114. The second user closes the gate 113 for confining the calves to the region defined by the platform 106b. Meanwhile, the first user drives away the herd for ensuring the safety of the first user and the calves. The calves are thereby isolated from the herd and the second user treats the isolated calves on the platform 106b inside the meshing enclosure 114 without being interrupted by violent reactions from the mother. After the treatment, the calves are let out of the meshing enclosure 114 by lowering the meshing enclosure 114 onto the ground surface, opening the gate 113, allowing the calves to get down from the platform 106b, and raising the meshing enclosure 114 once the calves get down onto the ground surface.

The foregoing examples have been provided merely for the purpose of explanation and are in no way to be construed as limiting of the present invention. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of isolating one or more animals from a herd, comprising the steps of:
    providing an animal isolator comprising:
        a meshing enclosure for confining said one or more animals, comprising:
            a front wall, a rear wall, and a pair of opposing side walls comprising a first side wall and a second side wall, wherein said front wall, said rear wall, and said opposing side walls define an open ended enclosure;
        a partially closed base partially closing a first end of said open ended enclosure, wherein said partially closed base comprises a platform and an opening to said ground surface, wherein said platform defines at least four edges on a periphery of said platform, wherein two of said edges adjoin said first side wall and said second side wall, another one of said edges adjoins said front wall, and another one of said edges is exposed to said opening to said ground surface;
        a vehicle mounting assembly comprising:
            a plurality of tubular structures disposed on a lower surface of said platform of said partially closed base, wherein each of said tubular structures defines a front edge aligned with an edge common to said platform and said front wall; and
            an attachment unit provided on said front wall for detachably attaching said meshing enclosure to one of a rear end and a front end of said vehicle; and
        a gate for confining said one or more animals to a region defined by said platform, wherein said gate extends from said first side wall to said second side wall;
    detachably attaching said meshing enclosure to one of said rear end and said front end of a vehicle using said vehicle mounting assembly;
    raising said detachably attached meshing enclosure above ground surface and driving said vehicle through said herd;
    lowering said detachably attached meshing enclosure over said one or more animals from said herd and capturing said one or more animals through said opening in said partially closed base of said detachably attached meshing enclosure for isolating said one or more animals from said herd;
    driving said captured one or more animals onto said platform by advancing said gate towards said platform, wherein said gate traverses a region defined by said opening to said ground surface to drive said captured one or more animals onto said platform in said meshing enclosure; and
    confining said captured one or more animals to a region defined by said platform in said meshing enclosure using said gate;
    whereby said confinement of said captured one or more animals in said detachably attached meshing enclosure isolates said captured one or more animals from said herd.

2. The method of claim 1, wherein said confined one or more animals are treated in said meshing enclosure.

3. The method of claim 1, further comprising the step of inserting one or more adjustable width forks of one of said rear end of said vehicle and said front end of said vehicle into said tubular structures of said vehicle mounting assembly for detachably attaching said meshing enclosure to said vehicle.

4. The method of claim 1, wherein the step of driving said animals onto said platform comprises the steps of:
    providing a first wing, a second wing, and an opening at said rear wall of said meshing enclosure for guiding said one or more animals into said meshing enclosure through said opening at said rear wall, wherein said first wing is pivotally hinged to a first edge common to said first side wall and said rear wall, wherein said second wing is pivotally hinged to a second edge common to said second side wall and said rear wall;

opening said first wing and said second wing for guiding said one or more animals into said meshing enclosure;

driving said one or more animals into said meshing enclosure through said opening at said rear wall;

closing said first wing and said second wing; and driving said one or more animals onto said platform.

5. The method of claim 4, wherein a first hydraulic controller is attached to said first side wall and said first wing for controlling pivotal movement of said first wing, and wherein a second hydraulic controller is attached to said second side wall and said second wing for controlling pivotal movement of said second wing.

6. A method of isolating one or more animals from a herd, comprising the steps of:

providing an animal isolator comprising:

a meshing enclosure for confining said one or more animals, comprising:

a front wall, a rear wall, and a pair of opposing side walls comprising a first side wall and a second side wall, wherein said front wall, said rear wall, and said opposing side walls define an open ended enclosure;

a partially closed base partially closing a first end of said open ended enclosure, wherein said partially closed base comprises a platform and an opening to said ground surface, wherein said platform defines at least four edges on a periphery of said platform, wherein two of said edges adjoin said first side wall and said second side wall, another one of said edges adjoins said front wall, and another one of said edges is exposed to said opening to said ground surface;

a vehicle mounting assembly comprising:

a plurality of tubular structures disposed on a lower surface of said platform of said partially closed base, wherein each of said tubular structures defines a front edge aligned with an edge common to said platform and said front wall; and an attachment unit provided on said front wall for detachably attaching said meshing enclosure to one of a rear end and a front end of said vehicle; and a gate for confining said one or more animals to a region defined by said platform, wherein said gate is pivotally hinged to said second side wall, wherein said gate extends from said first side wall to said second side wall in a closed position;

detachably attaching said meshing enclosure to one of said rear end and said front end of a vehicle using said vehicle mounting assembly;

raising said detachably attached meshing enclosure above ground surface and driving said vehicle through said herd;

lowering said detachably attached meshing enclosure over said one or more animals from said herd and capturing said one or more animals through said opening in said partially closed base of said detachably attached meshing enclosure for isolating said one or more animals from said herd;

driving said captured one or more animals onto said platform by closing said gate, wherein said gate substantially traverses a region defined by said opening to said ground surface to drive said captured one or more animals to said platform in said meshing enclosure; and confining said captured one or more animals to a region defined by said platform in said meshing enclosure using said gate;

whereby said confinement of said captured one or more animals in said detachably attached meshing enclosure isolates said captured one or more animals from said herd.

7. The method of claim 6, wherein a latch is provided on said first side wall for fastening said gate to said first side wall in said closed position.

* * * * *